(12) United States Patent
King

(10) Patent No.: US 6,773,036 B1
(45) Date of Patent: Aug. 10, 2004

(54) SADDLE TEE, SADDLE TEE AND TAP, AND FLUID CONNECTION FOR IRRIGATION LINES

(75) Inventor: Thomas A. King, Ballwin, MO (US)

(73) Assignee: Tom King Harmony Products, Inc., St, Louis, MO (US)

( * ) Notice: Subject to any disclaimer, the term of this patent is extended or adjusted under 35 U.S.C. 154(b) by 0 days.

(21) Appl. No.: 10/138,711

(22) Filed: May 3, 2002

(51) Int. Cl.$^7$ .......................... F16L 33/22; G16K 43/00
(52) U.S. Cl. .......................... 285/5; 285/197; 24/20 TT
(58) Field of Search ........................... 285/197, 5, 198, 285/199; 24/20 TT; 137/317, 318; 239/272

(56) References Cited

U.S. PATENT DOCUMENTS

| | | |
|---|---|---|
| 1,928,316 A | 9/1933 | Muto |
| 2,839,075 A | 6/1958 | Mueller |
| 3,162,211 A | 12/1964 | Barusch |
| 3,258,822 A | 7/1966 | Schlesch et al. |
| 3,280,846 A | 10/1966 | Anderson et al. |
| 3,343,724 A | 9/1967 | Malpas |
| 3,432,188 A | 3/1969 | Turner |
| 3,460,715 A | 8/1969 | Lane et al. |
| 3,460,721 A | 8/1969 | Hamel et al. |
| 3,471,176 A | 10/1969 | Gilchrist |
| 3,489,441 A | 1/1970 | Macolm |
| 3,891,150 A | 6/1975 | Hoff et al. |
| 3,999,785 A | 12/1976 | Blakeley |
| 4,076,038 A | 2/1978 | Wynne |
| 4,112,944 A * | 9/1978 | Williams ..................... 604/244 |
| 4,158,461 A | 6/1979 | Francis |
| 4,183,120 A * | 1/1980 | Thorne ........................ 24/16 R |
| 4,239,265 A | 12/1980 | King, Sr. |
| 4,258,742 A | 3/1981 | Louthan et al. |
| 4,373,235 A | 2/1983 | Korgaonkar |
| 4,557,024 A * | 12/1985 | Roberts et al. ........... 24/20 TT |
| 4,730,636 A | 3/1988 | Volgstadt et al. |
| 4,789,189 A | 12/1988 | Robertson |
| D307,541 S * | 5/1990 | Tres ............................. D8/396 |
| 4,935,992 A * | 6/1990 | Due ........................... 24/16 R |
| 5,054,820 A * | 10/1991 | Lesquir et al. ............... 285/197 |
| 5,095,564 A | 3/1992 | Kruger |
| 5,105,844 A | 4/1992 | King, Sr. |
| 5,157,815 A * | 10/1992 | Dyer ........................... 24/270 |
| 5,216,784 A * | 6/1993 | Dyer ........................ 24/20 TT |
| 5,640,991 A | 6/1997 | King |
| 5,694,972 A | 12/1997 | King |
| 5,846,412 A * | 12/1998 | Tharp ........................ 210/220 |
| 5,964,241 A | 10/1999 | King |
| 6,473,943 B1 * | 11/2002 | Thacker ..................... 24/20 R |

OTHER PUBLICATIONS

U.S. patent application Publication, Publication No. US 2001/0032667A1, Publication Date Oct. 25, 2001, title: Tap and Saddle for Forming a Hinged Coupon.

* cited by examiner

Primary Examiner—Eric K. Nicholson
(74) Attorney, Agent, or Firm—Harness, Dickey & Pierce, P.L.C.

(57) ABSTRACT

A saddle tee and saddle tee tap combination for making fluid connections with an irrigation line. The saddle tee comprises a body having first and second ends, and a passage therethrough, and a clamp on the second end of the body engaging the irrigation line in alignment with the passage, the clamp being larger than the irrigation line. In one embodiment the clamp defines first and second cross sectional areas for receiving the irrigation line, and an insert separating the first and second areas and confining the irrigation line to the first area. In another embodiment, the tap for making a fluid connection has a flange thereon engaging the exterior of the irrigation line in the clamp. In another embodiment the saddle tee includes a resilient member in the clamp for resiliently engaging an irrigation line in the clamp. In still another embodiment, the saddle tee comprises a a clamp, larger than the irrigation line, at least partially encircling an irrigation line, with a threaded opening therein A body having a passage therethrough and having a threaded end threaded through the threaded opening in the clamp into engagement with the irrigation line in the clamp, with the passage through the body aligned with an irrigation line in the clamp.

1 Claim, 5 Drawing Sheets

SADDLE TEE, SADDLE TEE AND TAP, AND FLUID CONNECTION FOR IRRIGATION LINES

BACKGROUND OF THE INVENTION

This invention relates generally to a connector for an irrigation system, and in particular to an improved saddle tee and tap for making fluid connections with irrigation lines in an irrigation system.

Various types of connectors are used to make fluid connections with irrigation lines in an irrigation system. One such connector is a saddle tee, which can be used to make a connection anywhere along the length of the line, rather than just at one of the ends. Saddle tees allow taps to be inserted into the irrigation line, for example to connect a branch line to a main line, or to connect a sprinkler head or other device to a line.

Saddle tees were initially multi-piece devices secured onto an irrigation line with fasteners. Installation was difficult and time consuming, and often required tools. Examples of such saddle tees include those disclosed in U.S. Pat. Nos. 4,789,189, 5,095,564, and 5,104,844, incorporated herein by reference. Improvements have been made in saddle tees to reduce the number of parts, eliminate the need for separate fasteners, and make installation easier. The device disclosed in U.S. Pat. No. 5,694,972, incorporated herein by reference, is an example of such a device. Similarly the device disclosed in Published application Ser. No. 09/785,684, filed Feb. 16, 2001, and published as US 2001/0032667 on Oct. 25, 2001, is incorporated herein by reference.

SUMMARY OF THE INVENTION

The present invention relates to a saddle tee, and saddle tee and tap combination for making fluid connections with irrigation lines in a irrigation systems.

Generally, the invention comprises a saddle tee adapted to be secured on an irrigation line in an irrigation system, for mounting a tap for making a fluid connection with the irrigation line. The saddle tee includes a clamp for at least partially encircling the irrigation line. The clamp is preferably larger than the irrigation line to make it easier to secure the clamp around the irrigation line.

In one preferred embodiment, the clamp defines first and second cross sectional areas for receiving the irrigation line, and comprises an insert separating the first and second areas and confining the irrigation line to the first area The insert can have a hole that is aligned with the passage in the saddle tee for the tap, so that the tap can extend through the passage, through the hole in the insert, and into the irrigation line.

In another preferred embodiment, the clamp includes a resilient member in the clamp for resiliently engaging an irrigation line in the clamp to hold it in place.

In another embodiment the tap has a flange thereon engaging the exterior of an irrigation line in the clamp. The flange helps hold the irrigation line in place, and preferably also compresses the irrigation line into a ovalized cross section.

In another embodiment, the saddle tee comprises a clamp, larger than the irrigation line, for at least partially encircling an irrigation line. The clamp has a threaded opening therein. A body having a passage therethrough and a threaded end is threaded through the threaded opening in the clamp to engage the irrigation line in the clamp.

In another embodiment, the saddle tee comprises a clamp with an expansion loop that allow the clamp to resiliently expand to facilitate securing the clamp on an irrigation line, while providing secure engagement of the irrigation line in the clamp.

Thus the present invention allows saddle tees to be quickly and easily installed on irrigation lines, so that taps can be used to make fluid connection with the lines. The loose fit of the clamps allows the clamps to be easily installed, yet the irrigation line is held tightly in the clamp for example with an insert in the first embodiment, the tap in the second embodiment, the body of the third embodiment, or the resilient expansion loop of the sixth embodiment. Tabs can be provided to further facilitate the closing of the clamp.

BRIEF DESCRIPTION OF THE DRAWINGS

Corresponding reference numeral indicate corresponding parts through the several views of the drawings.

DETAILED DESCRIPTION OF THE PREFERRED EMBODIMENT

Figure 1:
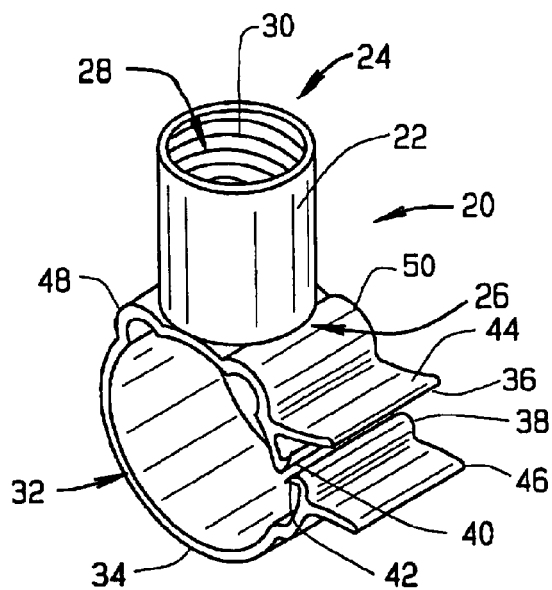
FIG. 1 is a perspective view of a first embodiment of a saddle tee constructed according to the principles of this invention.
Figure 2:
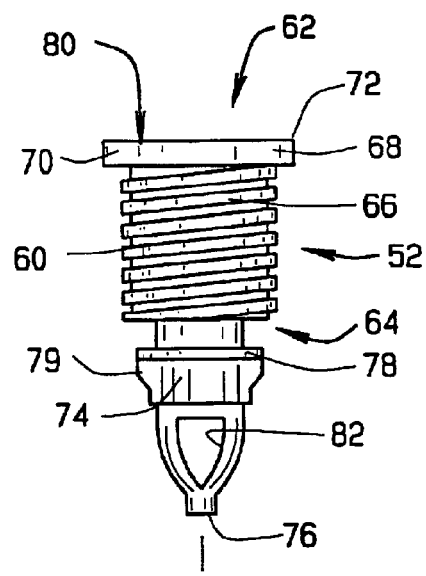
FIG. 2 is an exploded side elevation view of the first embodiment of a saddle tee and tap combination according to the principles of the present invention.
Figure 2:
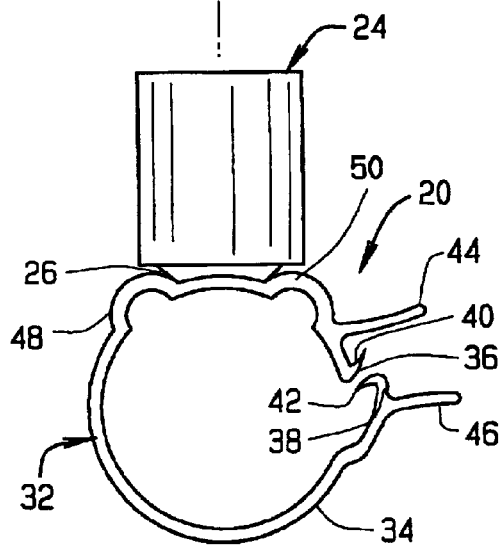
Figure 3:
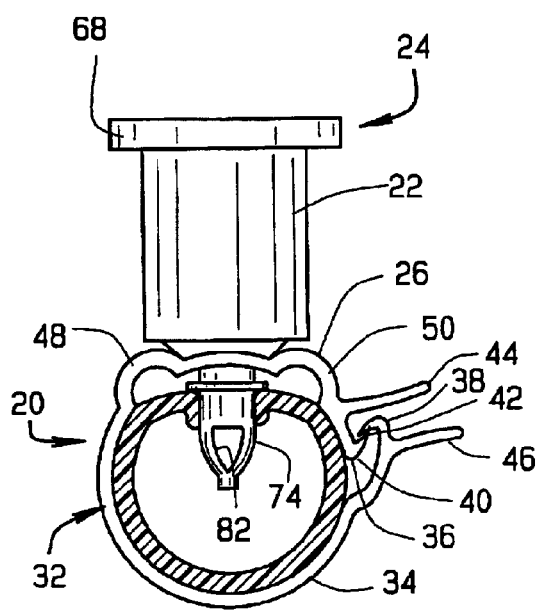
FIG. 3 is a vertical cross-sectional view through an irrigation line with which a connection has been made with the saddle tee and tap of the first embodiment.

A first embodiment of a saddle tee constructed according to principles of this invention is indicated generally as 20 in FIGS. 1–3. The saddle tee 20 comprises a body 22 having first and second ends 24 and 26, and a passage 28 therethrough. The passage 28 preferably has threads 30 for making a connection with another fluid line, a sprinkler, or the like. Rather than threads 30 the passage 28 could have some other connector scheme, for example posts or slots or bayonet fitting.

There is a clamp 32 on the second end 26 of the body 22. In this preferred embodiment, the clamp comprises a flexible band 34 having first and second ends 36 and 38. There are mating latch members 40 and 42 on the ends 36 and 38, respectively. The latch members 40 and 42 are adapted to engage each other to secure the ends 36 and 38 and close the clamp 32 around an irrigation line. The clamp 32 further comprises tabs 44 and 46 adjacent the ends 36 and 38. The tabs project radially outwardly, and are generally parallel to each other so that then can be grasped by the installers fingers, or with a tool, such as pliers, to draw the ends 36 and 38 together to engage the latch members 40 and 42. The band 34 preferably has semi-cylindrically bowed sections 48 and 50 that facilitate flexing of the band 34, and accommodate some girthwise expansion of the clamp 32.

A tap 52 adapted for use with the saddle tee 20 is also shown in FIG. 2. The tap 52 comprises a generally cylindrical body 60, having first and second ends 62 and 64, and external threads 66. There is a grip 68 at the first end 62 of the body 60. The grip 68 has wings 70 and 72 so that the tap 52 can be grasped or engaged with a tool. There is a tubular tip 74 on the second end 64 of the body 60. The tip 74 preferably tapers to a cutting member 76 at its distal end. Alternatively, the tip 74 could taper to a point. An annular flange 78 projects from the tip 74 intermediate its proximal and distal ends. The flange 78 projects sufficiently to engage the exterior of an irrigation line that the tip 74 penetrates. The flange preferably projects sufficiently and is positioned on the tip so that the tap can be advanced to cause the flange to compress and ovalize the irrigation line. Instead of, or in addition to, the flange 78, a grommet 79 (FIG. 2) can be provided on the tip 74. The grommet 79 can engage and compress, and seal with the wall of the irrigation line. In the absence of a flange 78, it is desirable to provide a shoulder on the tip 74 for engaging and supporting the grommet 79. Thus the clamp 32 can be made larger than the irrigation line, so that it is easy to close the clamp, and the flange can engage and hold the irrigation line in the clamp. Alternatively, the threads on the exterior of the tip can continue sufficiently to act like the flange 78, engaging the wall of the irrigation line.

The tap 52 has a passage 80 extending therethrough. One end of the passage 80 opens in the first end 62 of the body 60, and preferably has internal threads or other provision for making a connection with the tap. The other end of the passage 80 terminates in windows 82 in the side of the tip for making a fluid connection with the lumen of the irrigation line that that tap 52 penetrates. In addition to, or instead of, the windows 82 in the side of the tip, a window 82 can be provided in the bottom of the tip for making a fluid connection with the lumen fo the irrigation line that the tap 52 penetrates.

Figure 4:
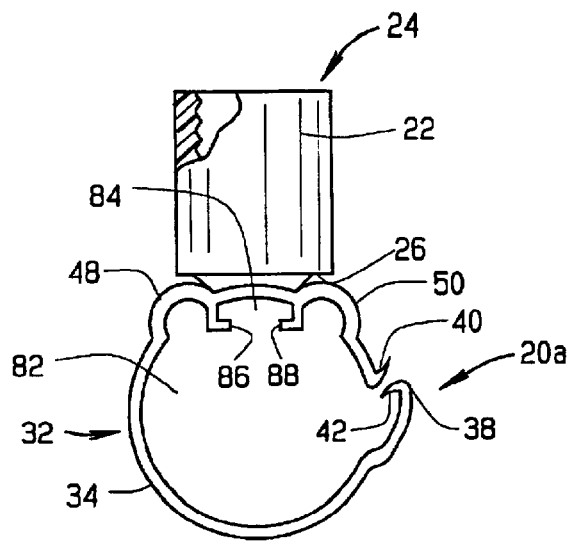
FIG. 4 is a side elevation view of a second embodiment of a saddle tee according to the principles of the present invention, with a portion broken away to reveal details of construction.
Figure 6:
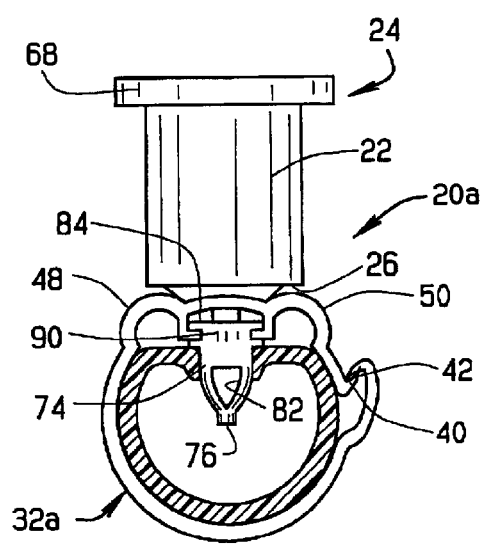
FIG. 6 is a vertical cross-sectional view of an irrigation line with which a connection has been made with the saddle tee and tap of the second embodiment.
Figure 5:
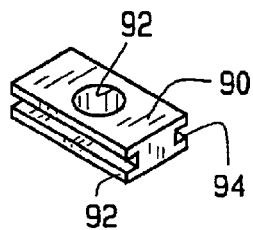
FIG. 5 is a perspective view of an insert for use with the second embodiment of the saddle tee according to the principles of the present invention.

A second embodiment of the saddle tee constructed according to the principles of this invention is indicated generally as 20a in FIGS. 4–6. The saddle tee 20a is similar in construction to saddle tee 20, and corresponding reference numerals indicate corresponding parts. However, unlike saddle tee 20, the clamp 32a of saddle tee 20a defines two cross-sectional areas 83 and 84, for receiving the irrigation line. The saddle tee 20 also has opposed ridges 86 and 88 separating the first and second areas 83 and 84. An insert 90, having grooves 92 and 94 on opposite sides, can be inserted into the clamp, between the ridges 86 and 88, to separate the fist and second areas, confining the irrigation line to the first area 83, and thereby in effect tightening the clamp. Thus the clamp 32a with both areas 83 and 84 is larger than the irrigation line, so that the clamp can be easily closed around the irrigation line. The first and second areas are preferably oriented so that the insert 90 in the space between the areas 83 and 84 is aligned with the passage in the body. Once the clamp has been closed, the insert 90 can be inserted into the clamp to tighten the clamp on the irrigation line. The insert 90 preferably has an opening 96 therein which aligns with the passage in the body to accommodate the tip of the tap member in the passage. Thus the tip 74 of the tap 52 helps retain the insert 90.

In an alterative implementation of the saddle tee 20a of the second embodiment, the insert 90 can be inserted into the clamp before it is secured on the irrigation line. In this implementation, the insert 90 is preferably made of a resilient material, so that it can flex to make it easier to close the clamp around the irrigation line, and so that it resiliently engages the irrigation line one the clamp is closed.

Figure 7:
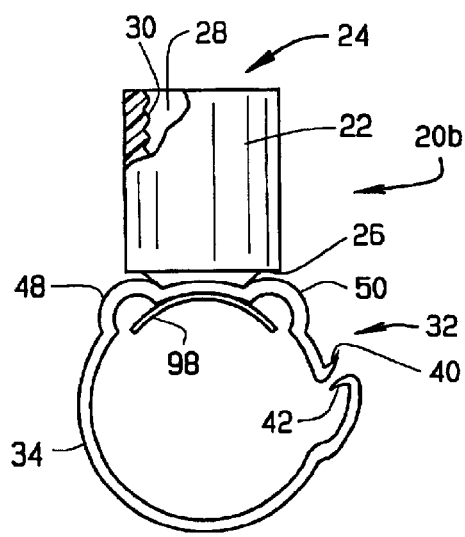
FIG. 7 is a sides elevation view of a third embodiment of a saddle tee constructed according to the principles of this invention, with a portion broken away to reveal details of construction.
Figure 8:
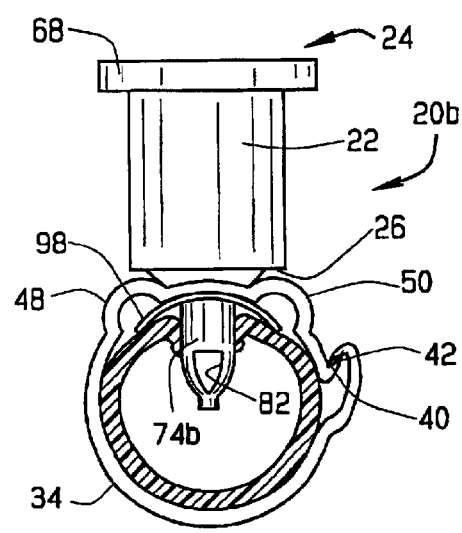
FIG. 8 is a vertical cross-sectional view of an irrigation line with which a connection has been made using the saddle tee and tap of the third embodiment.

A third embodiment of the saddle tee constructed according to the principles of this invention is indicated generally as 20b in FIGS. 7–8 The saddle tee 20b is similar in construction to saddle tee 20, and corresponding reference numerals indicate corresponding parts. However, unlike saddle tee 20, saddle tee 20b includes resilient wing members 98 that resilient push against an irrigation line engaged in the clamp 32. Of course some other resilient member could be provided for holding the irrigation in the clamp, including leaf springs, soil springs, foam members, etc. Thus the clamp 32 can be made larger to more easily close around the irrigation line, and the resilient wing members 98 resiliently hold the irrigation line in place in the clamp.

Figure 9:
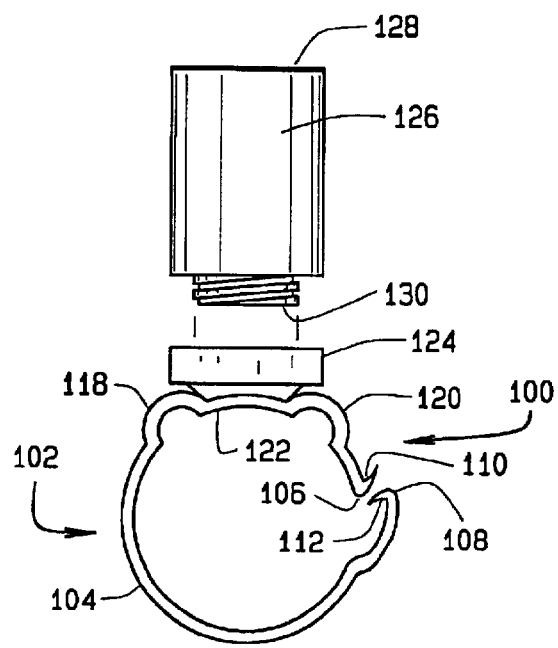
FIG. 9 is an exploded side elevation view of a fourth embodiment of a saddle tee constructed according to the principles of this invention.
Figure 10:
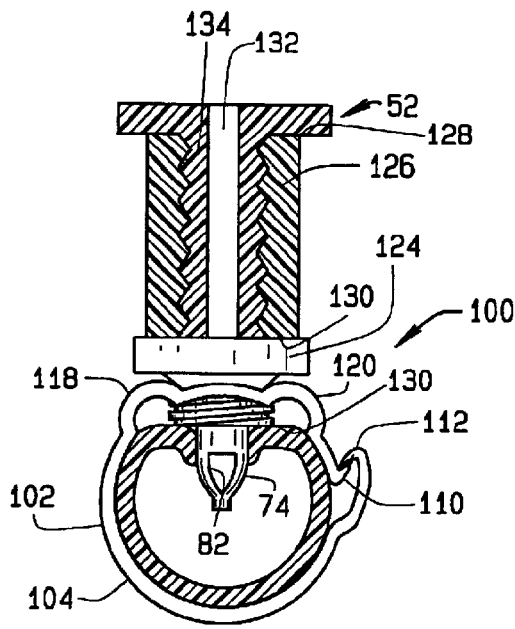
FIG. 10 is a vertical cross-sectional view of an irrigation line with which a connection has been made using the saddle tee and tap of the fourth embodiment, and wiih portions of the saddle tee in cross-section to show details of construction.

A fourth embodiment of a saddle tee constructed according to the principles of this invention is indicated generally as 100 in FIGS. 9–10. The saddle tee 100 comprises a clamp 102, which in this preferred embodiment comprises a flexible band 104 having first and second ends 106 and 108. There are mating latch members 110 and 112 on the ends 106 and 108, respectively. The latch members 110 and 112 are adapted to engage each other to secure the ends 106 and 108 and close the clamp 102 around an irrigation line. The clamp 102 may further comprise tabs (not shown) adjacent the ends 106 and 108. The tabs project radially outwardly, and are generally parallel to each other so that then can be grasped by the installers fingers, or with a tool, such as pliers, to draw the ends 106 and 108 together to engage the latch members 110 and 112. The band 104 preferably has semi-cylindrically bowed sections 118 and 120 that facilitate flexing of the band 104, and accommodate some girthwise expansion of the clamp 102.

The clamp 102 further comprises an opening 122 therein. In this preferred embodiment the opening 122 is surrounded by a circular bracket 124. The saddle tee 100 also comprises a body 126 having first and second ends 128 and 130, and a passage 132 therethrough. The passage 132 preferably has threads 134 for making a connection with another fluid line, a sprinkler, or the like. Rather than threads 134 the passage 132 could have some other connector scheme, for example posts or slots or bayonet fitting.

The second end 130 is adapted to extend through the opening 122 in the circular bracket 124, and engage an irrigation line in the clamp 102. Thus the clamp 102 can be made larger than the irrigation line to make closing the clamp easier, and the second end 130 can hold the irrigation line in place within the clamp. The second end may also operate to compress and ovalize the irrigation line within the clamp. A tap, such as tap 52 can be threaded into the passage 132 in the body 126, and into the irrigation line in the clamp 102 to make a fluid connection.

Figure 11:
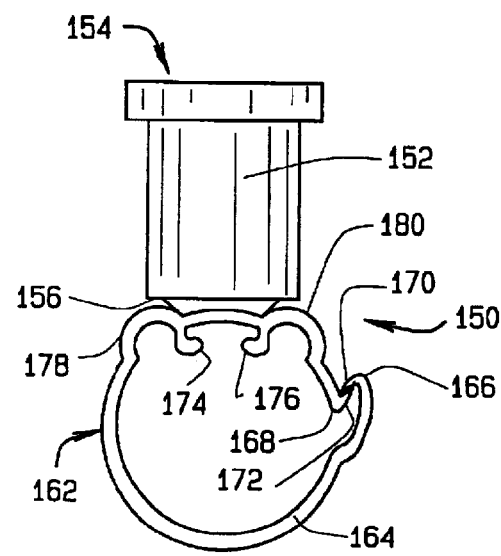
FIG. 11 is a side elevation view of a fifth embodiment of a saddle tee constructed according to the principles of this invention.
Figure 12:
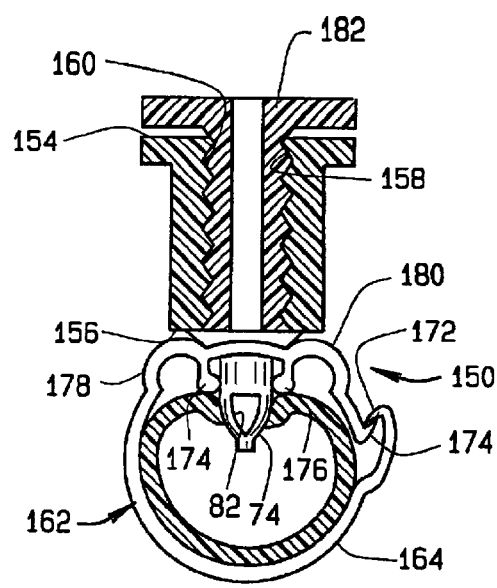
FIG. 12 is a vertical cross-sectional view of an irrigation line with which a connection has been made using the saddle tee and tap of the fifth embodiment, and with portions of the saddle tee in cross-section to show details of construction

A fifth embodiment of a saddle tee constructed according to the principles of this invention is indicated generally as 150 in FIGS. 11–12. The saddle tee 150 comprises a body 152 having first and second ends 154 and 156, and a passage 158 therethrough. The passage 158 preferably has threads 160 for making a connection with another fluid line, a sprinkler, or the like. Rather than threads 160 the passage 158 could have some other connector scheme, for example posts or slots or bayonet fitting.

There is a clamp 162 on the second end 156 of the body 152. In this preferred embodiment, the clamp comprises a flexible band 164 having first and second ends 166 and 168. There are mating latch members 170 and 172 on the ends 166 and 168, respectively. The latch members 170 and 172 are adapted to engage each other to secure the ends 166 and 168 and close the clamp 162 around an irrigation line. The clamp 162 further comprises hinged cam members 174 and 176. The band 164 preferably has semi-cylindrically bowed sections 178 and 180 that facilitate flexing of the band 164, and accommodate some girthwise expansion of the clamp 162.

A tap 182 is adapted to extend through the passage 158 in the body 162. The tap may be like the tap 52, and corresponding parts are identified with corresponding numbers. The tip of the tap 182 urges the cam members 174 and 176 into engagement with the exterior of an irrigation line disposed in clamp 152 holding the irrigation line in place, and preferably also ovalizing the irrigation line, as shown in FIG. 12.

Figure 13A:
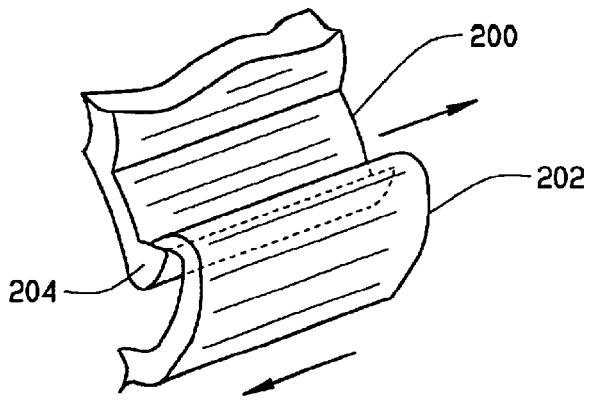
FIG. 13A is a perspective view of a first embodiment of anti-twist latch members adapted for use with the clamps of the various embodiments of saddles tees of this invention.
Figure 13B:
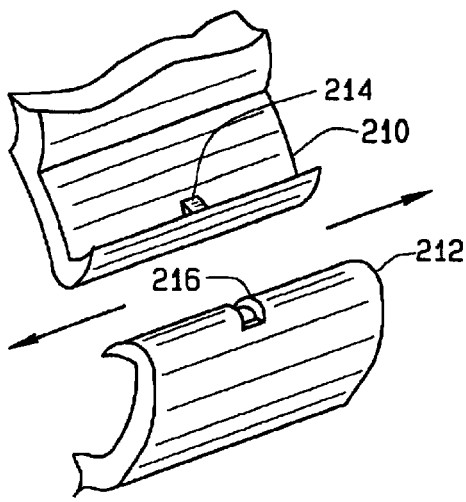
FIG. 13B is a perspective view of a second embodiment of anti-twist latch members adapted for use with the clamps of the various embodiments of saddle tees of this invention.
Figure 13C:
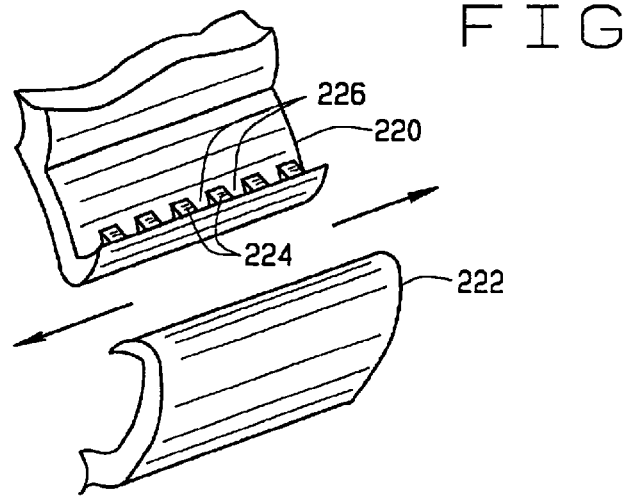
FIG. 13C is a perspective view of a third embodiment of anti-twist latch members adapted for use with the clamps of thee various embodiments of saddle tees of this invention.

A particular problem with this type of saddle tee is that twisting forces can cause the latch members to translate relative to each other, and release the clamp. As shown in FIG. 13A, first and second latch members 200 and 202 on the ends of a band forming a clamp are adapted to engage each other. The latches 200 and 202 are formed by oppositely facing j-shaped channels. In accordance with the principles of this invention, a wall 204 is incorporated at at least one end of one of the j-shaped channels, to prevent the latch members from translating relative to each other in the direction of arrows. While the wall 204 is shown in the latch 200, it could be on the latch 202. Of course a wall 204 could be formed at each of one of the j-shaped channels, or on one end of one of the j-shaped channels and the opposite end of the other j-shaped channel. As shown in FIG. 13B, first and second latch members 210 and 212 are formed by oppositely facing j-shaped channels. In accordance with the principles of this invention, a web 214 is formed in one of the j-shaped channels, and the other of the j-shaped channels has a slot 216 for accommodate the web 214 and preventing relative translation of the latch members. Of course, the web 214 and slot 216 could be provided in the other of the j-shaped channels. As shown in FIG. 13C, first and second latch members 220 and 222 are formed by oppositely facing j-shaped channels. In accordance with the principles of this invention, a plurality of teeth 224 separated by gaps 226 are provided on each of the latch members. The teeth 224 on the latch member 220 are adapted to fit in the gaps 226 on the latch member 222, and the teeth 224 on the latch member 222 are adapted to fit in the gaps 226 on the latch member 220, to prevent relative translation of the latch members.

In accordance with the principles of this invention other types of devices for engaging the latch members to prevent relative translation of the latch members can be used.

Figure 14:
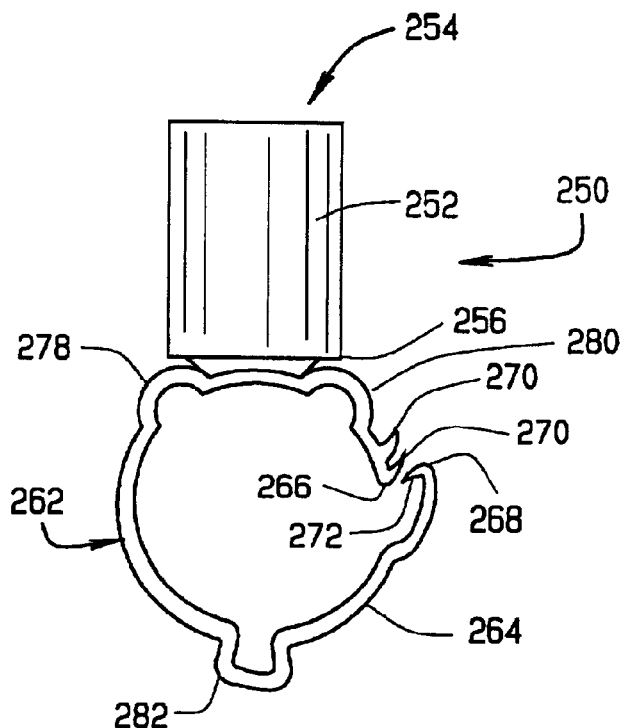
FIG. 14 is a side elevation view of a sixth embodiment of a saddle tee constructed according to the principles of this invention.
Figure 15:
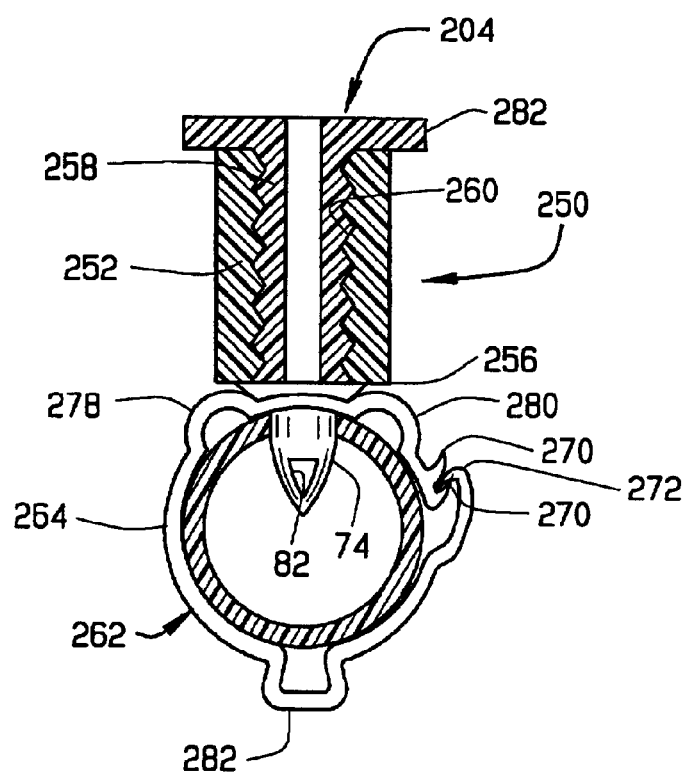
FIG. 15 a vertical cross-sectional view of an irrigation line with which a connection has been made using the saddle tee and tap of the sixth embodiment, and with portions of the saddle tee in cross-section to show details of construction.

A sixth embodiment of a saddle tee constructed according to the principles of this invention is indicated generally as 250 in FIGS. 14–15. The saddle tee 250 comprises a body 252 having first and second ends 254 and 256, and a passage 258 therethrough. The passage 258 preferably has threads 260 for making a connection with another fluid line, a sprinkler, or the like. Rather than threads 260 the passage 258 could have some other connector scheme, for example posts or slots or bayonet fitting.

There is a clamp 262 on the second end 256 of the body 252. In this preferred embodiment, the clamp comprises a flexible band 264 having first and second ends 266 and 268. There are mating latch members 270 and 272 on the ends 266 and 268, respectively. The latch members 270 and 272 are adapted to engage each other to secure the ends 266 and 268 and close the clamp 262 around an irrigation line. There may be more than one latch members 270 on the end 266, and/or more than one latch members 272 on end 268, so that the size of the clamp 262 is adjustable to accommodate irrigation lines of different sizes, and/or to adjust the compressive force of the clamp on the irrigation line. The band 264 preferably has semi-cylindrically bowed sections 278 and 280 that facilitate flexing of the band 264, and accommodate some girthwise expansion of the clamp 262. Instead of, or in addition to the bowed sections 278 and 280, an expansion loop 282 can be provided on the band 264. The expansion loop 282 can be conveniently provided on the band 264 opposite the body 252 as shown, but could be located at some other position and orientation on the band. The expansion loop 282 allows the clamp to resiliently expand so that the latch members 270 and 272 can more easily engage each other to close the clamp 262, and resiliently engage the irrigation line. The expansion loop 282 is particularly useful when multiple latch members 270 and/or 272 are provided. The tension in the clamp caused by the resilient expansion of the clamp, helps to hold the latch members together.

A tap 284 is adapted to extend through the passage 258 in the body 252. The tap may be like the tap 52, and corresponding parts are identified with corresponding numbers. The tip of the tap 284 penetrates the irrigation line and makes a fluid connection with the irrigation line, which is held tightly by the resilience of the clamp provided by the expansion loop 282.

While the various saddles may be secured in an irrigation line in a conventional vertical orientation, for receiving a tap in the vertical direction, in accordance with the principles of this invention, the saddles can also be mounted to extend generally horizontally, so that the tap is inserted in a generally horizontal direction. This mounting gives the connections a significantly lower profile, which means that the irrigation lines do not have to be buried as deeply.

What is claimed is:

1. A saddle tee for use in making a fluid connection with an irrigation line in an irrigation system, the saddle tee comprising a body having first and second ends, and a passage therethrough, and a clamp on the second end of the body for engaging the irrigation line in alignment with the passage, the clamp comprising a band having first and second ends with mating latch members comprising oppositely facing j-shaped channels on each end, and further comprising an anti-translation member on at least one of the j-shaped channel members for resisting relative translation of the latch members to prevent their disengagement, the anti-translation member comprising a plurality of spaced teeth on each of the j-shaped channel members adapted to interengage to resist relative translation of the latch members.

* * * * *